(12) United States Patent
Akita et al.

(10) Patent No.: US 7,635,539 B2
(45) Date of Patent: Dec. 22, 2009

(54) NON-AQUEOUS ELECTROLYTE SECONDARY BATTERY

(75) Inventors: Hiroyuki Akita, Kobe (JP); Koji Hasumi, Kobe (JP); Yoshinori Kida, Kobe (JP)

(73) Assignee: Sanyo Electric Co., Ltd., Osaka (JP)

( * ) Notice: Subject to any disclaimer, the term of this patent is extended or adjusted under 35 U.S.C. 154(b) by 513 days.

(21) Appl. No.: 11/528,681

(22) Filed: Sep. 28, 2006

(65) Prior Publication Data

US 2007/0082269 A1    Apr. 12, 2007

(30) Foreign Application Priority Data

Sep. 28, 2005  (JP)  ............................. 2005-282208
Sep. 11, 2006  (JP)  ............................. 2006-245507

(51) Int. Cl.
*H01M 6/04* (2006.01)
*H01M 4/50* (2006.01)
(52) U.S. Cl. ...................................... 429/188; 429/224
(58) Field of Classification Search .................. 429/188
See application file for complete search history.

(56) References Cited

U.S. PATENT DOCUMENTS 6,391,497 B1    5/2002  Yoon et al.

FOREIGN PATENT DOCUMENTS

| JP | 4-188571 | 7/1992 |
|---|---|---|
| JP | 11-317227 | 11/1999 |
| JP | 2000-12027 | 1/2000 |
| JP | 2002-231226 | 8/2002 |
| JP | 2003-217657 | * 7/2003 |

* cited by examiner

*Primary Examiner*—Patrick Ryan
*Assistant Examiner*—Ashley Kwon
(74) *Attorney, Agent, or Firm*—McDermott Will & Emery LLP

(57) ABSTRACT

As a negative electrode active material, carbon materials such as natural graphite, artificial graphite, non-graphitized carbon, and cork (charcoal) can be used. Further, a negative electrode comprises an active material layer including a group of particulate negative electrode active materials, and nickel is carried on a surface of the active material layer. Examples of a method of carrying nickel on a negative electrode surface include a method by coating, an evaporation method, and a method of bringing nickel ions into existence in a non-aqueous electrolyte to deposit nickel on a negative electrode surface. The amount of nickel added to the non-aqueous electrolyte is not less than 0.0008 mol/l nor more than 0.007 mol/l.

9 Claims, 3 Drawing Sheets

F I G. 1
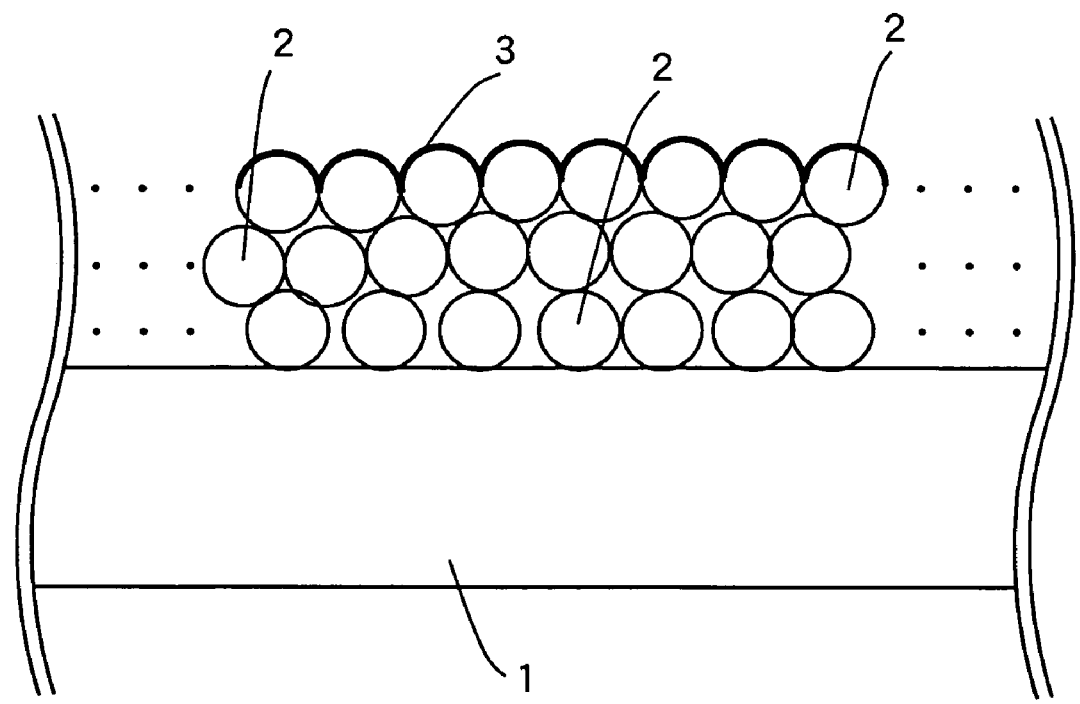

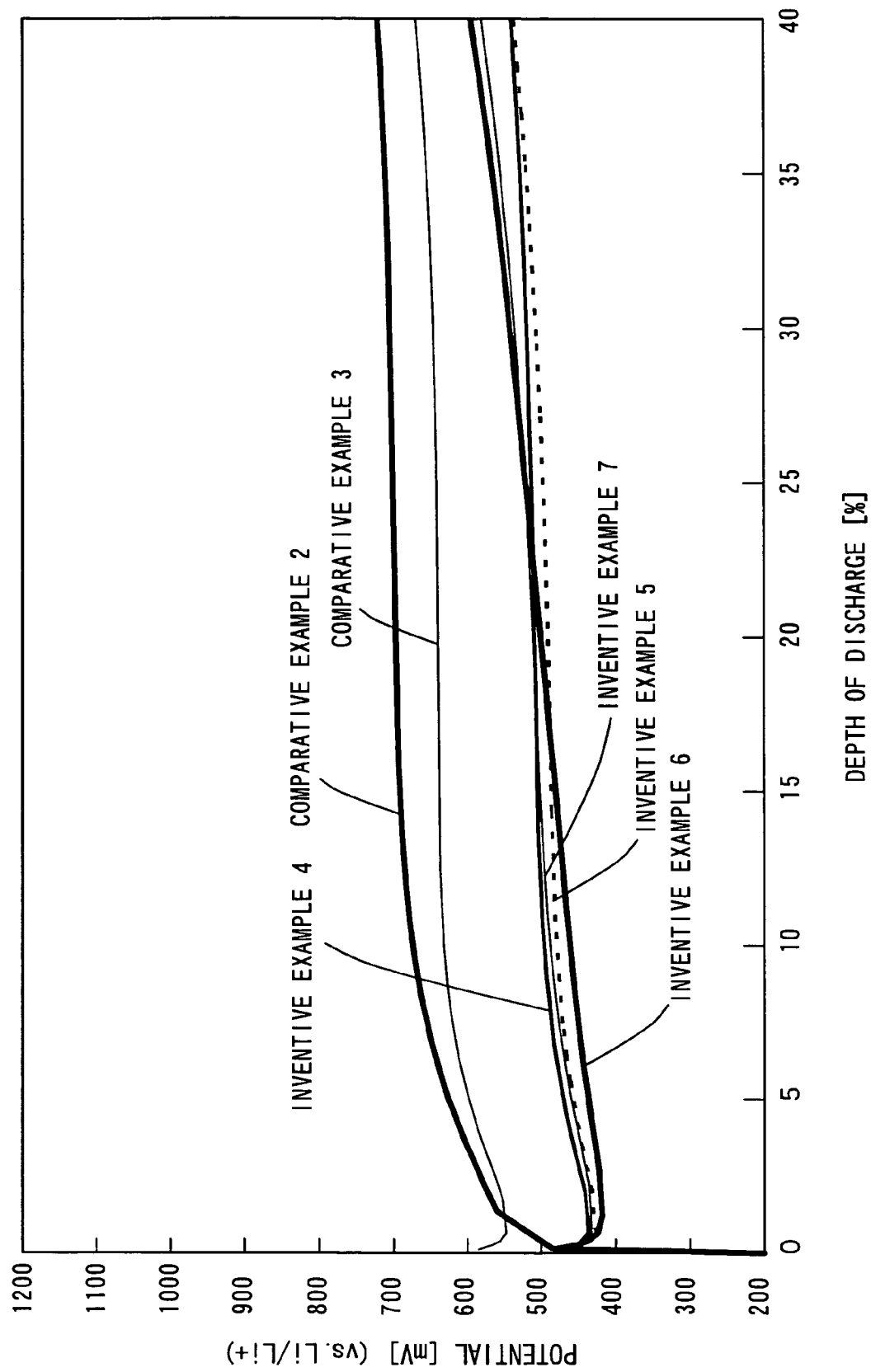

NON-AQUEOUS ELECTROLYTE SECONDARY BATTERY

BACKGROUND OF THE INVENTION

1. Field of the Invention

The present invention relates to a non-aqueous electrolyte secondary battery comprising a positive electrode, a negative electrode, and a non-aqueous electrolyte.

2. Description of the Background Art

Non-aqueous electrolyte secondary batteries, so adapted that a non-aqueous electrolyte is used, and lithium ions are transferred between a positive electrode and a negative electrode to carry out charge and discharge, are currently utilized as secondary batteries having high energy densities.

Generally used as such non-aqueous electrolyte secondary batteries is one using a lithium transition metal composite oxide such as $LiCoO_2$ as a positive electrode, using a lithium metal, a lithium alloy, or a carbon material capable of intercalating and deintercalating lithium as a negative electrode, and using an organic solvent such as ethylene carbonate or diethyl carbonate in which an electrolytic salt composed of a lithium salt such as $LiBF_4$ or $LiPF_6$ is dissolved as a non-aqueous electrolyte.

In recent years, researches on the use of the non-aqueous electrolyte secondary batteries as power sources for machine tools and assist bicycles have been actively conducted by making use of high weight energy densities and high volume energy densities that characterize the non-aqueous electrolyte secondary batteries.

As positive electrode active materials (positive electrode materials) in the non-aqueous electrolyte secondary batteries used for these applications, a lithium cobalt composite oxide, a lithium nickel composite oxide, and a lithium manganese composite oxide have been examined. Among them, the lithium manganese composite oxide being abundant as resources and being low-priced have been paid attention to, and researches have been actively conducted toward commercialization. It is known that out of lithium manganese composite oxides, a lithium manganese composite oxide having a spinel structure is superior in high-rate discharge (large-current discharge) characteristics.

In the non-aqueous electrolyte secondary battery using lithium manganese oxide having a spinel structure as a positive electrode active material, however, deterioration of storage characteristics at high temperatures is a great problem. This is said to be because manganese (Mn) is dissolved from a positive electrode at the time of high-temperature storage.

In a case where lithium manganese oxide having a spinel structure is used as a positive electrode active material, deterioration of discharge characteristics after high-temperature storage becomes significant, and a voltage rapidly drops as discharge is started, resulting in a reduced discharge capacity. The voltage drops until it reaches not more than a discharge cut-off voltage and consequently, discharge becomes impossible to carry out. This is considered to be because manganese is dissolved from a positive electrode and is deposited on a carbon negative electrode so that the charge-discharge characteristics of the negative electrode are deteriorated.

Therefore, it is proposed that metal elements such as manganese composing a positive electrode active material are added to a non-aqueous electrolyte, to restrain dissolution of the metal elements in the positive electrode active material into the non-aqueous electrolyte in a chemical equilibrium manner (see JP 4-188571 A).

Even if the dissolution of the metal elements such as manganese from the positive electrode can be restrained, however, it is impossible to prevent the metal elements from being deposited on the carbon negative electrode. As a result of this, the charge-discharge characteristics of the negative electrode are deteriorated, as described above.

Therefore, it is proposed that metals such as titanium (Ti) and platinum (Pt) are carried on a surface of a negative electrode active material, to restrain deterioration of the charge-discharge characteristics of the negative electrode (see JP 2000-12027 A).

Furthermore, it is proposed that metal elements or metal ions such as cobalt (Co) are contained in predetermined amounts in a non-aqueous electrolyte, to improve the charge-discharge characteristics of a negative electrode (see JP 2003-217657 A).

In the non-aqueous secondary battery disclosed in JP 2000-12027 A, however, a method of carrying the metals such as titanium (Ti) and platinum (Pt) on the surface of the negative electrode active material makes it necessary to carry 0.5 to 20% by weight of the metals. Materials uninvolved in charge and discharge are thus used in large amounts, resulting in not only a reduced discharge capacity but also a greatly reduced energy density per unit weight.

The process of carrying the metals on the surface of the negative electrode active material is required, which causes cost to rise. Such a problem similarly occurs in not only lithium manganese oxide having a spinel structure from which much manganese is dissolved at the time of high-temperature storage but also all positive electrode active materials containing manganese as a constituent element.

Furthermore, in the non-aqueous electrolyte secondary battery disclosed in JP 2003-217657 A, it is difficult to significantly restrain voltage drop at the time of high-rate discharge (large-current discharge).

SUMMARY OF THE INVENTION

An object of the present invention is to provide a non-aqueous electrolyte secondary battery in which voltage drop can be significantly restrained at the time of high-rate discharge (large-current discharge).

(1) A non-aqueous electrolyte secondary battery according to an aspect of the present invention comprises a positive electrode capable of intercalating and deintercalating lithium ions and having a positive electrode active material containing manganese; a negative electrode capable of intercalating and deintercalating lithium ions and having a negative electrode active material containing a carbon material; and a non-aqueous electrolyte, the non-aqueous electrolyte containing nickel, the amount of the nickel being not less than 0.0008 mol/l nor more than 0.007 mol/l at the time of assembling the non-aqueous electrolyte secondary battery.

In the non-aqueous electrolyte secondary battery, the non-aqueous electrolyte contains nickel, so that the nickel is deposited on a surface of the negative electrode in carrying out charge and discharge. The nickel is thus brought into existence on the surface of the negative electrode, which allows voltage drop at the time of high-rate discharge (large-current discharge) to be significantly restrained even if manganese is dissolved from the positive electrode at the time of high-temperature storage and the dissolved manganese is deposited on the negative electrode. Thus, charge and discharge can be satisfactorily carried out.

Although the above-mentioned action is not necessarily definite, it is roughly considered as follows.

When the manganese is deposited on the negative electrode, a good-quality solid electrolyte interface (SEI) that has already been formed on a surface of the negative electrode active material is destroyed and degraded, so that lithium ion mobility in the SEI is reduced, which inhibits the intercalation and deintercalation of the lithium ions in the negative electrode. As a result, the manganese is deposited on the negative electrode, so that it is considered that the charge-discharge characteristics of the negative electrode are deteriorated.

A very rigid SEI that is not destroyed even if the manganese is deposited on the surface of the negative electrode is formed on the surface of the negative electrode by bringing the nickel into existence on the surface of the negative electrode, as described above. Thus, it is considered that the deterioration of the charge-discharge characteristics of the negative electrode is restrained.

The setting of the amount of the nickel to not less than 0.0008 mol/l nor more than 0.007 mol/l allows the deterioration of the charge-discharge characteristics of the negative electrode that occurs when the amount of the nickel is less than 0.0008 mol/l to be restrained, and makes it possible for the nickel deposited on the surface of the negative electrode to prevent the charge-discharge characteristics of the negative electrode from being deteriorated by inhibiting the intercalation and deintercalation of the lithium ions when the amount of the nickel is not less than 0.007 mol/l.

(2) It is preferable that the amount of the nickel is not less than 0.002 mol/l nor more than 0.004 mol/l. In this case, the deterioration of the charge-discharge characteristics of the negative electrode is further restrained or prevented.

(3) The positive electrode active material may contain lithium manganese oxide having a spinel structure. In this case, the lithium manganese oxide having a spinel structure is superior in high-rate discharge, so that the high-rate discharge can be satisfactorily carried out.

(4) The negative electrode may comprise an active material layer including a group of particulate negative electrode active materials, and the nickel may be carried on a surface of the active material layer.

In this case, the negative electrode contains the active material layer, so that the nickel can be easily carried on the surface of the active material layer.

The non-aqueous electrolyte secondary battery according to the present invention allows voltage drop at the time of large-current discharge to be significantly restrained.

Other features, elements, characteristics, and advantages of the present invention will become more apparent from the following description of preferred embodiments of the present invention with reference to the attached drawings.

BRIEF DESCRIPTION OF THE DRAWINGS

FIG. 1 is a schematic view showing the configuration of a negative electrode;

FIG. 3 is a graph showing the respective results of charge-discharge tests carried out using three electrode-type cells in inventive examples 4 to 7 and comparative examples 2 and 3.

DESCRIPTION OF THE PREFERRED EMBODIMENTS

Figure 2:
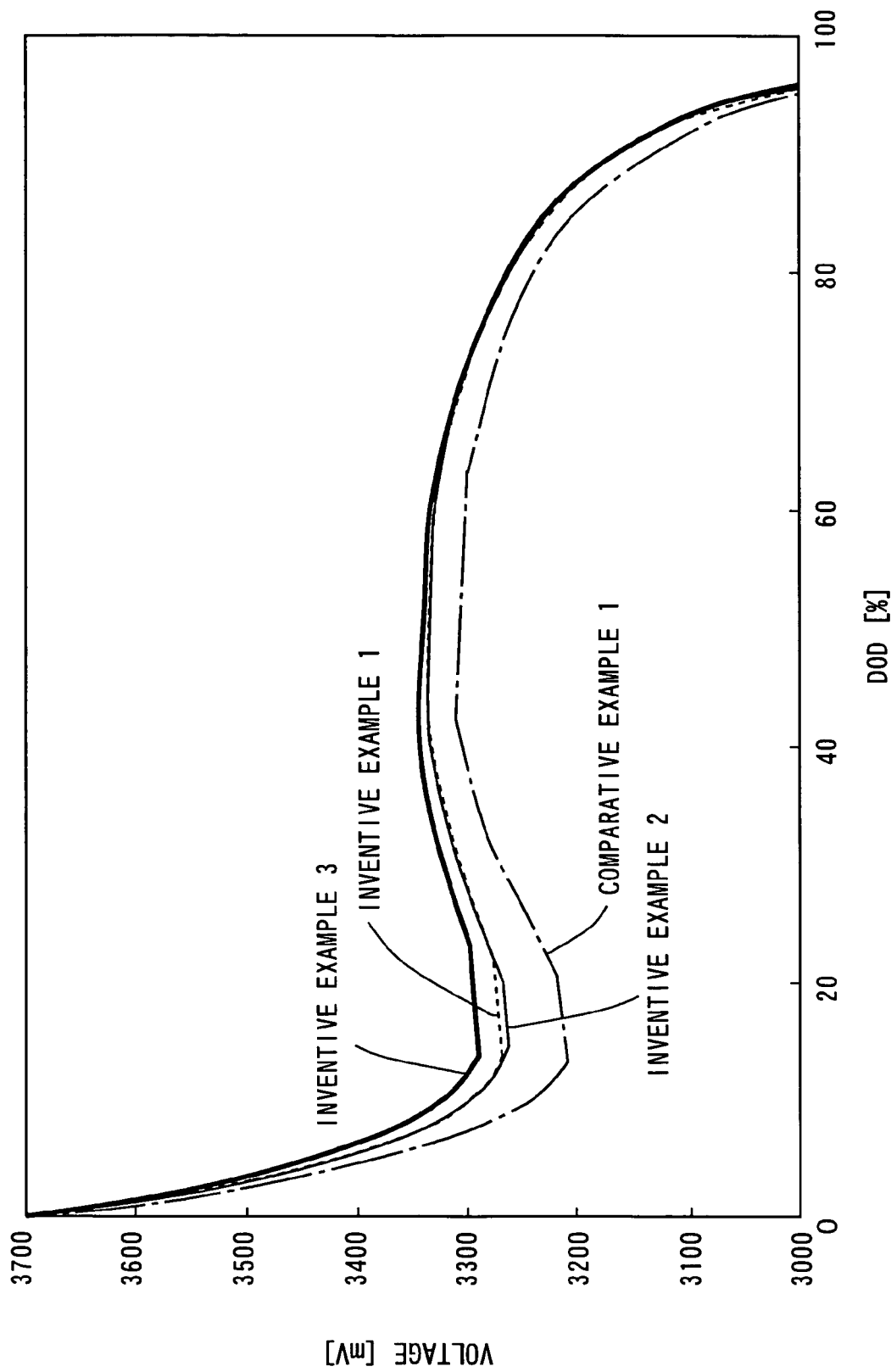
FIG. 2 is a graph showing the respective results of measurement (discharge curves) of charge-discharge tests of non-aqueous electrolyte secondary batteries in inventive examples 1 to 3 and a conventional example 1.

A non-aqueous electrolyte secondary battery according to the present embodiment will be described below while referring to the drawings.

The non-aqueous electrolyte secondary battery according to the present embodiment comprises a positive electrode, a negative electrode, and a non-aqueous electrolyte.

Note that various materials described below and the thickness, the concentration, and the density thereof are not limited to the following and can be appropriately set.

(1) Configuration of Positive Electrode

For a positive electrode, materials capable of intercalating and deintercalating lithium (Li) ions and containing manganese (Mn) as a constituent element are used.

Examples of a positive electrode active material include $LiMnO_2$ and $LiMn_2O_4$ (hereinafter referred to as basic positive electrode active materials).

Other examples of the positive electrode active material include one obtained by replacing a part of at least one of elements such as lithium, manganese, and oxygen in the basic positive electrode active material with another element. Examples include $LiNi_{0.33}Co_{0.33}Mn_{0.33}O_2$ and $Li_{1.05}Mn_{1.9}Al_{0.05}O_{3.96}S_{0.04}$.

A mixture of not less than two positive electrode active materials including at least one of the foregoing positive electrode active materials can be used as a positive electrode material.

(2) Configuration of Negative Electrode

As the negative electrode active material, carbon materials such as natural graphite, artificial graphite, non-graphitized carbon, and cork (charcoal) can be used.

Here, the negative electrode in the present embodiment will be described using the drawings. FIG. 1 is a schematic view showing the configuration of the negative electrode.

As shown in FIG. 1, a group of particulate negative electrode active materials 2 is formed on a current collector of negative electrode 1. A series of respective surfaces, exposed to the exterior, of the plurality of negative electrode active materials 2 on the most superficial layer is referred to as a negative electrode surface 3. A gap between the negative electrode active materials 2 in the interior is filled with a binder (not shown).

In the present embodiment, nickel (Ni) is brought into existence on the negative electrode surface 3, which allows voltage drop at the time of high-rate discharge (high-current discharge) to be significantly restrained. Although the action is not necessarily definite, it is roughly considered as follows. The negative electrode comprises an active material layer including the group of particulate negative electrode active materials 2, and the nickel is carried on a surface of the active material layer.

When manganese is deposited on the negative electrode, a good-quality solid electrolyte interface (SEI) that has already been formed on surfaces of the negative electrode active materials 2 is destroyed and degraded, so that lithium ion mobility in the SEI is reduced, which inhibits the intercalation and deintercalation of lithium ions in the negative electrode. As a result, the manganese is deposited on the negative electrode, so that it is considered that the charge-discharge characteristics of the negative electrode are deteriorated.

A very rigid SEI that is not destroyed even if manganese is deposited on the negative electrode surface 3 is formed on the negative electrode surface 3 by bringing the nickel into existence on the negative electrode surface 3, as described above. Thus, it is considered that the deterioration of the charge-discharge characteristics of the negative electrode is restrained.

It can be confirmed by X-ray photoelectron spectroscopy (XPS), for example, that manganese dissolved in the non-aqueous electrolyte is deposited in a concentrated manner on the negative electrode surface 3. This eliminate the necessity of bringing nickel into existence on all the surfaces of the negative electrode active materials 2, i.e., inside of the negative electrode, so that the effect of restraining the deterioration of the charge-discharge characteristics of the negative electrode, as described above, can be obtained only by bringing nickel into existence on the negative electrode surface 3. Although the effect can be obtained in the use of any positive electrode active material containing manganese as a constituent element, it is particularly effective in a case where lithium manganese oxide having a spinel structure from which much manganese is dissolved at the time of high-temperature storage is used as the positive electrode active material.

Here, examples of a method of bringing nickel into existence on the negative electrode surface 3 include a method by coating, an evaporation method, and a method of bringing nickel ions into existence in a non-aqueous electrolyte to deposit nickel on the negative electrode surface 3.

In the method of bringing nickel ions into existence in the non-aqueous electrolyte to deposit nickel on the negative electrode surface 3 out of the foregoing methods, substantial capital investment or the like is not required, so that nickel can be easily brought into existence on the negative electrode surface 3. The amount of nickel added to the non-aqueous electrolyte is not less than 0.0008 mol/l and more preferably not less than 0.003 mol/l. If the amount of added nickel is too large, the nickel deposited on the negative electrode surface 3 inhibits intercalation and deintercalation of lithium ions to deteriorate the charge-discharge characteristics of the negative electrode, so that the amount of added nickel is not more than 0.007 mol/l.

It is preferable that the amount of added nickel is not less than 0.002 mol/l nor more than 0.004 mol/l. This further restrains the deterioration of the charge-discharge characteristics of the negative electrode.

Here, other examples of the method of bringing nickel ions into existence in a non-aqueous electrolyte include a method of adding a nickel compound that can be dissolved in a non-aqueous electrolyte, and a method of previously dissolving nickel in a non-aqueous electrolyte by oxidation-reduction reaction.

In a case where a lithium metal is used as the negative electrode active materials 2, an SEI formed on a surface of the lithium metal differs from that in a carbon material. Even if manganese is deposited on the lithium metal, therefore, the SEI is not destroyed. Even if nickel is brought into existence on the surface of the lithium metal, therefore, such a special effect, described above, that can be obtained in the carbon material is not produced.

(3) Fabrication of Non-aqueous Electrolyte

A non-aqueous electrolyte that includes an electrolytic salt dissolved in a non-aqueous solvent can be used.

The non-aqueous solvent may include that for use in general batteries such as cyclic carbonic esters, chain carbonic esters, esters, cyclic ethers, chain ethers, nitrils, amides, or the like and that made by combinations of these.

Cyclic carbonic esters include ethylene carbonate, propylene carbonate, butylene carbonate, and the like. Those in which a portion of or the entire hydrogen group is fluorinated may also be used, such as trifluoropropylene carbonate, fluoroethylene carbonate, and the like, for example.

Chain carbonic esters include dimethyl carbonate, methyl ethyl carbonate, diethyl carbonate, methyl propyl carbonate, ethyl propyl carbonate, methyl isopropyl carbonate, and the like. Those in which a portion of or the entire hydrogen group is fluorinated may also be used.

Esters include methyl acetate, ethyl acetate, propyl acetate, methyl propionate, ethyl propionate, γ-butyrolactone, and the like. Cyclic ethers include 1,3-dioxolane, 4-methyl-1,3-dioxolane, tetrahydrofuran, 2-methyl tetrahydrofuran, propylene oxide, 1,2-butylene oxide, 1,4-dioxane, 1,3,5-trioxane, furan, 2-methylfuran, 1,8-cineole, crown ether, and the like.

Chain ethers include 1,2-dimethoxyethane, diethyl ether, dipropyl ether, diisopropyl ether, dibutyl ether, dihexyl ether, ethyl vinyl ether, butyl vinyl ether, methyl phenyl ether, ethyl phenyl ether, butyl phenyl ether, pentyl phenyl ether, methoxytoluene, benzyl ethyl ether, diphenyl ether, dibenzyl ether, o-dimethoxybenzene, 1,2-diethoxyethane, 1,2-dibutoxyethane, diethylene glycol dimethyl ether, diethylene glycol diethyl ether, diethylene glycol dibutyl ether, 1,1-dimethoxymethane, 1,1-diethoxyethane, triethylene glycol dimethyl ether, tetraethylene glycol dimethyl ether, and the like.

Nitrils include acetonitril and the like. Amides include dimethylformamide and the like.

Examples of the electrolytic salt include lithium phosphate hexafluoride ($LiPF_6$), lithium borate tetrafluoride ($LiBF_4$), $LiCF_3SO_3$, $LiC_4F_9SO_3$, $LiN(CF_3SO_2)_2$, $LiN(C_2F_5SO_2)_2$, $LiAsF_6$, $LiN(CF_3SO_2)(C_4F_9SO_2)$, $LiC(CF_3SO_2)_3$, $LiC(C_2F_5SO_2)_3$, $LiClO_4$, $Li_2B_{10}Cl_{10}$, $LiB(C_2O_4)_2$, $LiB(C_2O_4)F_2$, $LiP(C_2O_4)_3$, $LiP(C_2O_4)_2F_2$, $Li_2B_{12}Cl_{12}$, and the like, and their mixtures.

In the present embodiment, a non-aqueous solvent obtained by mixing ethylene carbonate and dimethyl carbonate in a volume ratio of 1:1 is used as a non-aqueous electrolyte with the addition of lithium phosphate hexafluoride ($LiPF_6$) serving as an electrolytic salt at a concentration of 1.0 mol/l, followed by the addition of nickel at a concentration of 0.0008 to 0.007 mol/l.

(4) Fabrication of Non-aqueous Electrolyte Secondary Battery

A non-aqueous electrolyte secondary battery is fabricated by winding the positive electrode and the negative electrode, described above, so as to be opposed to each other with a separator made of polyethylene interposed therebetween to fabricate a wind body and sealing the fabricated wind body and the non-aqueous electrolyte in a battery can within a glow box under an argon (Ar) atmosphere.

(5) Effects of the Embodiment

In the present embodiment, the non-aqueous electrolyte has a nickel content of 0.0008 to 0.007 mol/l, so that nickel is deposited on the negative electrode surface 3 in carrying out charge and discharge. Nickel is thus brought in to existence on the negative electrode surface 3, which allows voltage drop at the time of high-rate discharge (large-current discharge) to be significantly restrained even if manganese is dissolved from the positive electrode at the time of high-temperature storage and the dissolved manganese is deposited on the negative electrode. Thus, charge and discharge can be satisfactorily carried out.

INVENTIVE EXAMPLES (a) Inventive Example 1

(a-1) Fabrication of Positive Electrode $Li_{1.1}Mn_{1.895}Al_{0.005}O_4$ that is lithium manganese oxide having a spinel structure was used as a positive electrode active material.

The above-mentioned positive electrode active material, fibrous carbon serving as a conducting agent, an N-methyl-2-pyrrolidone solution having polyvinylidene fluoride serving as a binder dissolved therein were prepared such that the weight ratio of the positive electrode active material, the conducting agent, and the binder would be 90:5:5, and were then mixed, to produce a slurry serving as a positive electrode mixture.

The produced slurry serving as the positive electrode mixture was applied onto an aluminum foil serving as a positive electrode collector, was dried, and was then rolled using a pressure roll. A current collector tab was attached to the current collector of positive electrode having the positive electrode mixture formed thereon, thereby completing a positive electrode.

(a-2) Fabrication of Negative Electrode

A solution obtained by dissolving graphite serving as negative electrode active materials 2, styrene-butadiene rubber serving as a binder, and carboxymethylcellulose serving as a thickening agent was prepared such that the weight ratio of the positive electrode active materials 2, the binder, and the thickening agent would be 98:1:1, and was then mixed, to produce a slurry serving as a negative electrode mixture.

The produced slurry serving as the negative electrode mixture was applied onto a copper foil serving as a current collector of negative electrode 1, was dried, and was then rolled using a pressure roll. A current collector tab was attached to the current collector of negative electrode 1 having the negative electrode mixture formed thereon, thereby completing a negative electrode.

(a-3) Fabrication of Non-aqueous Electrolyte

A non-aqueous solvent obtained by mixing ethylene carbonate and dimethyl carbonate in a volume ratio of 1:1 was used as a non-aqueous electrolyte with the addition of lithium phosphate hexafluoride ($LiPF_6$) serving as an electrolytic salt at a concentration of 1.0 mol/l, followed by the addition of nickel at a concentration of 0.0008 mol/l.

In this inventive example, $Ni(CH_3COO)_2$ powder obtained by drying $Ni(CH_3COO)_2.2H_2O$ under an atmosphere at a temperature of 110° C. in a vacuum state for four hours was used as nickel to be added.

(a-4) Fabrication of Non-Aqueous Electrolyte Secondary Battery

A cylindrical non-aqueous electrolyte secondary battery having a capacity of 1.1 Ah and having a diameter of 18 mm and a height of 65 mm was fabricated by winding the positive electrode and the negative electrode, described above, so as to be opposed to each other with a separator made of polyethylene interposed therebetween to fabricate a wind body and sealing the fabricated wind body and the non-aqueous electrolyte in a battery can within a glow box under an argon atmosphere.

(b) Inventive Example 2

A non-aqueous electrolyte secondary battery in an inventive example 2 was fabricated in the same manner as the non-aqueous electrolyte secondary battery in the inventive example 1 except that the amount of nickel added to a non-aqueous electrolyte was 0.0015 mol/l in the configuration thereof.

(c) Inventive Example 3

A non-aqueous electrolyte secondary battery in an inventive example 3 was fabricated in the same manner as the non-aqueous electrolyte secondary battery in the inventive example 1 except that the amount of nickel added to a non-aqueous electrolyte was 0.003 mol/l in the configuration thereof.

(d) Comparative Example 1

A non-aqueous electrolyte secondary battery in a comparative example 1 was fabricated in the same manner as the non-aqueous electrolyte secondary battery in the inventive example 1 except that no nickel was added to a non-aqueous electrolyte in the configuration thereof.

(e) Charge-Discharge Test

In each of the non-aqueous electrolyte secondary batteries fabricated in the inventive examples 1 to 3 and the comparative example 1, charge was carried out until a battery voltage reached 4.2 V at a constant current of 1.1 A, and constant-voltage charge was then carried out until the current reached 55 mA with the battery voltage of 4.2 V maintained.

Then, each of the non-aqueous electrolyte secondary batteries after the constant-voltage charge continued to be stored in a temperature controlled bath at a temperature of 60° C., was taken out of the temperature controlled bath after ten days, and was left at room temperature for five hours.

In each of the non-aqueous electrolyte secondary batteries that had been left, discharge was carried out until the battery voltage reached 2.5 V at a constant current of 10 A. The respective results of measurement (discharge curves) of the charge-discharge tests of the non-aqueous electrolyte secondary batteries are shown in FIG. 2.

In FIG. 2, the vertical axis indicates a voltage (mV), and the horizontal axis indicates a depth of discharge (DOD) (%). The depth of discharge means the ratio of the discharge capacity that has already been carried out to the capacity of a non-aqueous electrolyte secondary battery. For example, in a non-aqueous electrolyte secondary battery having a capacity of 100 Ah, the depth of discharge is 50% when 50 Ah is discharged from a fully charged state (where the DOC is 0%)

(f) Evaluation of Charge-Discharge Test

As can be seen from FIG. 2, in the non-aqueous electrolyte secondary batteries in the inventive examples 1 to 3 in which nickel was added to the non-aqueous electrolyte, voltage drop in early stages of discharge was more significantly restrained, as compared with that in the comparative example 1 in which no nickel was added to the non-aqueous electrolyte.

Particularly in the non-aqueous electrolyte secondary battery in the inventive example 3 in which the amount of nickel added to the non-aqueous electrolyte was 0.003 mol/l, the effect of restraining voltage drop greatly appeared.

The results of these show that the amount of nickel added to the non-aqueous electrolyte is preferably 0.0008 to 0.003 mol/l.

(g) Inventive Examples 4 to 7 and Comparative Example 2

In each of inventive example 4 to 7 and a comparative example 2, in order to examine the relationship between the amount of nickel deposited on a negative electrode and negative electrode characteristics, measurement (measurement of the amount of nickel), described later, was made, a three electrode-type cell was fabricated, and a charge-discharge test was carried out using the three electrode-type cell.

First, cylindrical non-aqueous electrolyte secondary batteries having a capacity of 1.1 Ah and having a diameter of 18 mm and a height of 65 mm were fabricated, as in the above-mentioned inventive example 1, each using a positive electrode including a positive electrode active material containing nickel and manganese in predetermined amounts and a negative electrode containing graphite as negative electrode active materials 2.

In each of the fabricated non-aqueous electrolyte secondary batteries, charge was carried out until a battery voltage reached 4.2 V at a constant current of 1.1 A, and constant-voltage charge was carried out until the current reached 55 mA with the battery voltage of 4.2 V maintained.

Then, each of the non-aqueous electrolyte secondary batteries after the constant-voltage charge continued to be stored in a temperature controlled bath at a temperature of 60° C., was taken out of the temperature controlled bath after 10 days, and was left at room temperature for five hours.

In each of the non-aqueous electrolyte secondary batteries that had been left, discharge was carried out until the battery voltage reached 2.5 V at a constant current of 0.22 A, and each of the non-aqueous electrolyte secondary batteries was then demounted to take out the negative electrode. Negative electrodes respectively measuring 2 cm by 2 cm and 2 cm by 5 cm were cut out of the negative electrodes taken out.

For each of the cut negative electrodes measuring 2 cm by 2 cm, the amount of nickel contained in the negative electrode was measured by inductively coupling plasma (ICP)-atomic emission spectroscopy. The results of the measurement are shown in Table 1.

TABLE 1

| | DEPOSITED METAL | DEPOSITION AMOUNT ($\mu m/cm^2$) | ION CONCENTRATION (mol/l) |
|---|---|---|---|
| INVENTIVE EXAMPLE 4 | Ni | 0.25 | 0.00084 |
| INVENTIVE EXAMPLE 5 | Ni | 0.57 | 0.0019 |
| INVENTIVE EXAMPLE 6 | Ni | 1.1 | 0.0037 |
| INVENTIVE EXAMPLE 7 | Ni | 2.1 | 0.0070 |
| COMPARATIVE EXAMPLE 2 | Ni | 2.79 | 0.0093 |

Here, it is experientially known that in a non-aqueous electrolyte secondary battery, metal ions existing in the non-aqueous electrolyte are deposited almost uniformly on a surface of a negative electrode active material layer.

The non-aqueous electrolyte secondary battery in the inventive example 4 has a width of 5.75 cm and a length of 83 cm. In this non-aqueous electrolyte secondary battery, a case where 0.25 $\mu g/cm^2$ of nickel per surface is deposited (inventive example 4) corresponds to a case where 0.00084 mol/l of nickel exists in the non-aqueous electrolyte, as shown in Table 1. Table 1 shows the amount of nickel deposited on each negative electrode in terms of the amount of nickel in the non-aqueous electrolyte as an ion concentration. Similarly, ion concentrations in the inventive examples 5 to 7 and the comparative example 2 are also shown in Table 1.

On the other hand, for each of the cut negative electrodes measuring 2 cm by 5 cm, the negative electrode serving as a working electrode and a counter electrode composed of a lithium metal were wound so as to be opposed to each other with a porous film separator made of polypropylene interposed therebetween, to fabricate a wind body.

A non-aqueous solvent obtained by mixing ethylene carbonate and dimethyl carbonate in a volume ratio of 1:1 was used as a non-aqueous electrolyte with the addition of lithium phosphate hexafluoride ($LiPF_6$) serving as an electrolytic salt at a concentration of 1.0 mol/l, and each of the fabricated wind bodies and the non-aqueous electrolyte were used, to fabricate a non-aqueous electrolyte secondary battery as a three electrode-type cell. A lithium metal was used as a reference electrode. In each of the fabricated non-aqueous electrolyte secondary batteries, a state where nickel was dissolved from the positive electrode so that the dissolved nickel existed in the non-aqueous electrolyte was established.

(h) Comparative Example 3

In a comparative example 3, the same negative electrode as that in the inventive example 1 was fabricated, and a negative electrode measuring 2 cm by 5 cm was cut out of the fabricated negative electrode.

The cut negative electrode serving as a working electrode and a counter electrode composed of a lithium metal were wound so as to be opposed to each other with a porous film separator made of polypropylene interposed therebetween, to fabricate a wind body.

A non-aqueous solvent obtained by mixing ethylene carbonate and dimethyl carbonate in a volume ratio of 1:1 was used as a non-aqueous electrolyte with the addition of lithium phosphate hexafluoride ($LiPF_6$) serving as an electrolytic salt at a concentration of 1.0 mol/l, and the fabricated wind body and the non-aqueous electrolyte were used, to fabricate a non-aqueous electrolyte secondary battery as a three electrode-type cell. A lithium metal was used as a reference electrode.

(i) Charge-Discharge Test and Evaluation Thereof

Here, in each of the three electrode-type cells fabricated in the inventive examples 4 to 7 and the comparative examples 2 and 3, in order to ensure the charge, the charge was carried out until a potential at the negative electrode using the reference electrode as reference reached 0.0 V at a current density of 0.5 $mA/cm^2$, the charge was then carried out until the potential reached 0.0 V at a current density of 0.25 $mA/cm^2$, the charge was further carried out until the potential reached 0.0 V at a current density of 0.1 $mA/cm^2$, and the discharge was carried out at a current density of 20 $mA/cm^2$.

FIG. 3 is a graph showing the respective results of the charge-discharge tests carried out using the three electrode-type cells in the inventive examples 4 to 7 and the comparative example 2 and 3.

The results of each of the charge-discharge tests in the inventive examples 4 to 7 exhibited discharge characteristics superior to those in the results of the charge-discharge test in the comparative example 3 in which no metal exists on the negative electrode surface, as shown in FIG. 3, although manganese is deposited in the negative electrode in the three electrode-type cell (already confirmed by the ICP-atomic emission spectroscopy). Although the reason for this is not necessarily definite, it is roughly considered as follows. The negative electrode comprises an active material layer including a group of particulate negative electrode active materials 2, and nickel is carried on a surface of the active material layer.

When manganese is deposited on the negative electrode, a good-quality solid electrolyte interface (SEI) that has already been formed on the surfaces of the negative electrode active materials 2 is destroyed and degraded, so that lithium ion mobility in the SEI is reduced, which inhibits intercalation and deintercalation of lithium ions in the negative electrode. As a result, manganese is deposited on the negative electrode, so that it is considered that the discharge characteristics of the negative electrode are deteriorated.

Nickel is brought into existence on the negative electrode surface 3, as described above, so that a very rigid SEI that is not destroyed even if manganese is deposited on the negative electrode surface 3 is formed on the negative electrode surface 3. Thus, it is considered that the deterioration of the discharge characteristics of the negative electrode is restrained.

Another reason why the results of each of the charge-discharge tests in the inventive examples 4 to 7 exhibited discharge characteristics superior to those in the results of the charge-discharge test in the comparative example 3 in which no metal exists on the negative electrode surface is considered to be the fact that the SEI formed on the negative electrode surface in a case where nickel is brought into existence on the negative electrode surface has characteristics in which lithium ions are more easily diffused than those in the SEI formed on the negative electrode surface in a case where no nickel exists on the negative electrode surface.

The results of the charge-discharge test in the comparative example 2 exhibited discharge characteristics inferior to those in the results of the charge-discharge test in the comparative example 3. This is considered to be because the amount of nickel existing on the negative electrode surface 3 is too large, so that the nickel inhibits intercalation and deintercalation of lithium ions.

(j) Comparative Examples 4 to 6

In comparative examples 4 to 6, the above-mentioned ion concentrations were respectively measured, and non-aqueous electrolyte secondary batteries serving as three electrode-type cells were respectively fabricated in the same manner as those in the inventive examples 4 to 7 and the comparative example 2 except that positive electrodes respectively including positive electrode active materials containing cobalt and manganese in predetermined amounts were used. In each of the fabricated non-aqueous electrolyte secondary batteries, a state where cobalt was dissolved from the positive electrode so that the dissolved cobalt existed in a non-aqueous electrolyte was established. The results of the measurement of the ion concentrations are shown in Table 2.

TABLE 2

|  | DE-POSITED METAL | DEPOSITION AMOUNT ($\mu m/cm^2$) | ION CONCENTRATION (mol/l) |
|---|---|---|---|
| COMPARATIVE EXAMPLE 4 | Co | 2.0 | 0.0064 |
| COMPARATIVE EXAMPLE 5 | Co | 2.7 | 0.0086 |
| COMPARATIVE EXAMPLE 6 | Co | 6.2 | 0.0198 |

The non-aqueous electrolyte secondary battery in the comparative example 4 has a width of 5.75 cm and a length of 83 cm. In this non-aqueous electrolyte secondary battery, a case where $2.0 \mu g/cm^2$ of cobalt per surface is deposited (comparative example 4) corresponds to a case where 0.0064 mol/l of cobalt exists in the non-aqueous electrolyte, as shown in Table 2. Table 2 shows the amount of cobalt deposited on each negative electrode in terms of the amount of cobalt in the non-aqueous electrolyte as an ion concentration. Similarly, ion concentrations in the comparative examples 5 and 6 are also shown in Table 2.

(k) Measurement of Working Potential Difference

Subsequently, a working potential difference of each of the negative electrodes in the three electrode-type cells fabricated in the inventive examples 4 to 7 and the comparative examples 2 and 4 to 6 on the basis of the negative electrode in the comparative example 3 was measured. Note that the working potential difference is at the time of a depth of discharge of 15% when voltage drop greatly occurred in high-rate discharge (large-current discharge) was carried out. The working potential differences in the respective examples are shown in Table 3.

TABLE 3

|  | DE-POSITION AMOUNT ($\mu m/cm^2$) | ION CONCENTRATION (mol/l) | WORKING POTENTIAL DIFFERENCE IN DOD OF 15% (mV) |
|---|---|---|---|
| INVENTIVE EXAMPLE 4 | 0.25 | 0.00084 | −137 |
| INVENTIVE EXAMPLE 5 | 0.57 | 0.0019 | −142 |
| INVENTIVE EXAMPLE 6 | 1.1 | 0.0037 | −157 |
| INVENTIVE EXAMPLE 7 | 2.1 | 0.0070 | −134 |
| COMPARATIVE EXAMPLE 2 | 2.79 | 0.0093 | 56 |
| COMPARATIVE EXAMPLE 4 | 2.0 | 0.0064 | 28 |
| COMPARATIVE EXAMPLE 5 | 2.7 | 0.0086 | 43 |
| COMPARATIVE EXAMPLE 6 | 6.2 | 0.0198 | 103 |

As shown in Table 3, in the inventive examples 4 to 7, each of the working potential differences takes a negative value. That is, each of potentials at the negative electrodes in the inventive examples 4 to 7 is lower than a potential at the negative electrode in the comparative example 3 (see FIG. 3, described above). Consequently, it is found that the reduction in a battery voltage (the difference between a potential at the positive electrode and a potential at the negative electrode) is restrained.

On the other hand, in the comparative example 2, the working potential difference takes a positive value. That is, a potential at the negative electrode in the comparative example 2 is higher than the potential at the negative electrode in the comparative example 3 (see FIG. 3, described above). Consequently, it is found that the reduction in the battery voltage is not restrained.

In each of the comparative examples 4 to 6, the working potential difference takes a positive value. That is, each of the potentials at the negative electrodes in the comparative examples 4 to 6 is higher than the potential at the negative electrode in the comparative example 3. Consequently, it is found that the reduction in the battery voltage is not restrained. This shows that if cobalt is contained in the non-aqueous electrolyte and is deposited on the surface of the negative electrode, the reduction in the battery voltage can not be restrained.

(l) Conclusion

From the foregoing results, it could be confirmed that the voltage drop at the time of high-rate discharge (large-current discharge) could be significantly restrained by making the non-aqueous electrolyte to have a nickel content of 0.0008 to 0.007 mol/l.

While preferred embodiments of the present invention have been described above, it is to be understood that variations and modifications will be apparent to those skilled in the art without departing the scope and spirit of the present invention. The scope of the present invention, therefore, is to be determined solely by the following claims.

What is claimed is:

1. A non-aqueous electrolyte secondary battery comprising:
   a positive electrode capable of intercalating and deintercalating lithium ions and having a positive electrode active material containing manganese;
   a negative electrode capable of intercalating and deintercalating lithium ions and having a negative electrode active material containing a carbon material; and
   a non-aqueous electrolyte,
   said non-aqueous electrolyte containing nickel,
   the amount of said nickel being not less than 0.0008 mol/l nor more than 0.004 mol/l at the time of assembling said non-aqueous electrolyte secondary battery.

2. The non-aqueous electrolyte secondary battery according to claim 1, wherein the amount of said nickel is not less than 0.002 mol/l nor more than 0.004 mol/l.

3. The non-aqueous electrolyte secondary battery according to claim 1, wherein said positive electrode active material contains lithium manganese oxide having a spinel structure.

4. The non-aqueous electrolyte secondary battery according to claim 2, wherein said positive electrode active material contains lithium manganese oxide having a spinel structure.

5. The non-aqueous electrolyte secondary battery according to claim 1, wherein
   said negative electrode comprises an active material layer including a group of particulate negative electrode active materials, and
   said nickel is carried on a surface of said active material layer.

6. The non-aqueous electrolyte secondary battery according to claim 2, wherein
   said negative electrode comprises an active material layer including a group of particulate negative electrode active materials, and
   said nickel is carried on a surface of said active material layer.

7. The non-aqueous electrolyte secondary battery according to claim 3, wherein
   said negative electrode comprises an active material layer including a group of particulate negative electrode active materials, and
   said nickel is carried on a surface of said active material layer.

8. The non-aqueous electrolyte secondary battery according to claim 4, wherein
   said negative electrode comprises an active material layer including a group of particulate negative electrode active materials, and
   said nickel is carried on a surface of said active material layer.

9. The non-aqueous electrolyte secondary battery according to claim 1, wherein nickel acetate is added to said non-aqueous electrolyte.

* * * * *